United States Patent
Cho et al.

(10) Patent No.: US 10,409,540 B2
(45) Date of Patent: Sep. 10, 2019

(54) ELECTRONIC DEVICE INCLUDING A PLURALITY OF TOUCH DISPLAYS AND METHOD FOR CHANGING STATUS THEREOF

(71) Applicant: Samsung Electronics Co., Ltd., Gyeonggi-do (KR)

(72) Inventors: Kwangik Cho, Incheon (KR); Jungwon Suh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/680,368

(22) Filed: Aug. 18, 2017

(65) Prior Publication Data

US 2018/0060010 A1 Mar. 1, 2018

(30) Foreign Application Priority Data

Aug. 25, 2016 (KR) ........................ 10-2016-0108350

(51) Int. Cl.
*G06F 3/14* (2006.01)
*G06F 3/041* (2006.01)
(Continued)

(52) U.S. Cl.
CPC .......... *G06F 3/1423* (2013.01); *G06F 1/1643* (2013.01); *G06F 1/1652* (2013.01);
(Continued)

(58) Field of Classification Search
CPC ... G06F 3/0416; G06F 3/1423; H04M 1/0266
(Continued)

(56) References Cited

U.S. PATENT DOCUMENTS 9,146,585 B2 9/2015 Schrock et al.
2007/0232336 A1 10/2007 Kim et al.
(Continued)

FOREIGN PATENT DOCUMENTS

EP 1 843 563 A1 12/2006
JP 5831929 B2 11/2015
(Continued)

OTHER PUBLICATIONS

International Search Report dated Nov. 20, 2017.
European Search Report dated Apr. 5, 2019.

*Primary Examiner* — Calvin C Ma
(74) *Attorney, Agent, or Firm* — Cha & Reiter, LLC.

(57) ABSTRACT

Disclosed is an electronic device including a plurality of touch displays. The electronic device includes a first touch display configured to face a first direction and comprise a first touch panel and a first display panel, a second touch display configured to face a second direction opposite the first direction and comprise a second touch panel and a second display panel, a rotation detection sensor configured to sense a rotation of the electronic device, a processor electrically connected to the first touch display, the second touch display and the rotation detection sensor, and memory electrically connected to the processor. The memory may store instructions which control the processor so that the processor changes each of the first touch panel and the first display panel from an on state to an off state and changes each of the second touch panel and the second display panel from the off state to the on state based on at least one rotation value received from the rotation detection sensor when the electronic device turns on a virtual axis.

18 Claims, 12 Drawing Sheets

(51) Int. Cl.
*H04M 1/02* (2006.01)
*G06F 3/147* (2006.01)
*G06F 1/16* (2006.01)
*H04M 15/00* (2006.01)
*H04W 4/24* (2018.01)

(52) U.S. Cl.
CPC .......... *G06F 1/1694* (2013.01); *G06F 3/0416* (2013.01); *G06F 3/147* (2013.01); *H04M 1/0266* (2013.01); *H04M 1/0268* (2013.01); *H04M 15/83* (2013.01); *H04M 15/84* (2013.01); *H04M 15/846* (2013.01); *H04M 15/85* (2013.01); *H04W 4/24* (2013.01); *G06F 2200/1637* (2013.01); *G06F 2203/04102* (2013.01); *G09G 2370/16* (2013.01); *G09G 2380/02* (2013.01); *H04M 2250/12* (2013.01); *H04M 2250/16* (2013.01); *H04M 2250/22* (2013.01)

(58) Field of Classification Search
USPC .................................................. 345/1.1, 1.3
See application file for complete search history.

(56) References Cited

U.S. PATENT DOCUMENTS

| | | |
|---|---|---|
| 2009/0251565 A1 | 10/2009 | Molgaard |
| 2010/0245209 A1* | 9/2010 | Miller .................. G06F 1/1618 345/1.3 |
| 2010/0298032 A1 | 11/2010 | Lee et al. |
| 2013/0050164 A1* | 2/2013 | Rericha ................. G06F 1/1626 345/205 |
| 2014/0198038 A1 | 7/2014 | Yagihashi et al. |
| 2014/0201653 A1 | 7/2014 | Han et al. |
| 2015/0268699 A1* | 9/2015 | Bathiche ............... G06F 1/1649 345/1.3 |
| 2015/0301665 A1 | 10/2015 | Kim et al. |
| 2016/0109973 A1 | 4/2016 | Kim et al. |

FOREIGN PATENT DOCUMENTS

| | | |
|---|---|---|
| KR | 1020100125938 A | 12/2010 |
| KR | 1020140091296 A | 7/2014 |
| KR | 1020150121443 A | 10/2015 |

* cited by examiner

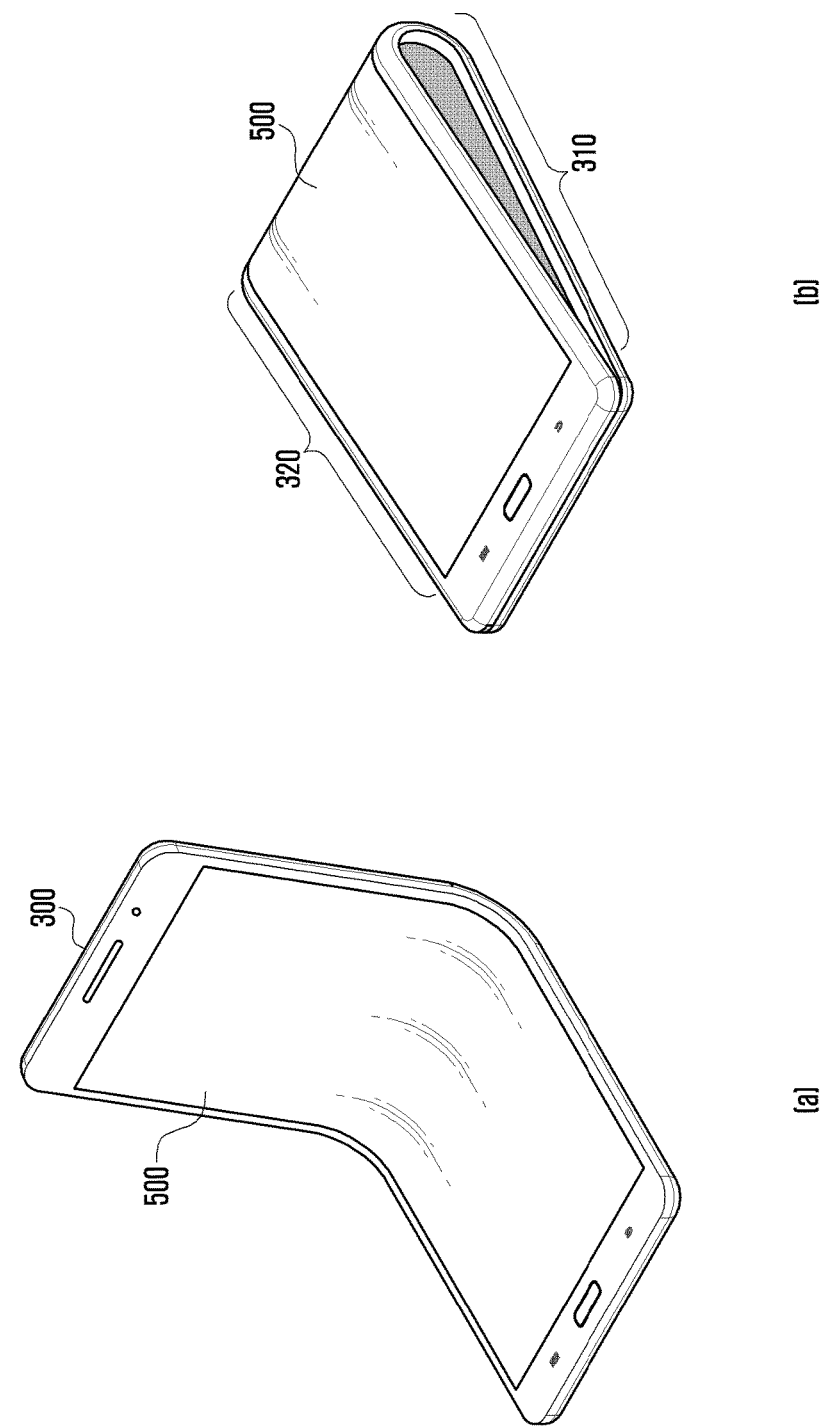

ELECTRONIC DEVICE INCLUDING A PLURALITY OF TOUCH DISPLAYS AND METHOD FOR CHANGING STATUS THEREOF

CLAIM OF PRIORITY

The present application is related to and claims the benefit under 35 U.S.C. § 119(a) of a Korean patent application filed on Aug. 25, 2016, in the Korean intellectual property office and assigned serial no. 10-2016-0108350, the entire disclosure of which is hereby incorporated by reference.

TECHNICAL FIELD

Various embodiments of the present disclosure relate to an electronic device and a method for changing the state of the electronic device and, more particularly, to an electronic device including a plurality of touch displays and a method for changing the state of the electronic device.

BACKGROUND

An electronic device may include a display. The thickness and weight of the electronic device with display mounted thereon have been significantly reduced. The display is capable of providing various functions that simplify usage of the device and allow portability.

Shortcomings and disadvantages of conventional and traditional approaches will become apparent through comparison of such systems through comparison to certain aspects of embodiments presented in the remainder of the application and drawings.

SUMMARY

From among electronic devices, there may be an electronic device including a plurality of touch displays. In the electronic device including the plurality of touch displays, a user may optionally use a first touch display and second touch display that form the plurality of touch displays.

For example, in a process of performing, by the user, a task using the first touch display, the user may perform a task using the second touch display again.

Alternatively, when the front of the first touch display and the front of the second touch display are located on the same plane, the user may use the first touch display and the second touch display together as a single screen. For example, the user may move or copy content being displayed on a screen of the first touch display to a screen of the second touch display.

Alternatively, when the first touch display and the second touch display maintain a specific angle, the user may use the first touch display as a main display and use also the second touch display as a sub-display. For example, when content is displayed on a screen of the first touch display, a UI capable of manipulating the content may be displayed on the second touch display.

In an electronic device including a plurality of touch displays, a first touch display and a second touch display may be located in opposite directions.

In this situation, while a user performs a task using the first touch display, the user may turn the electronic device over in order to perform a task using the second touch display. In this case, the user performs inconvenient manipulations for turning off a screen of the first touch display, turning the electronic device over, and turning on a screen of the second touch display again.

Furthermore, while turning the electronic device over, the user may inadvertently touch the first touch display or the second touch display, thereby resulting in a malfunction of the electronic device.

Accordingly, an object of an electronic device according to the present disclosure is to prevent inconvenience in a user manipulation and an unwanted malfunction of the electronic device when the user tries to use a second touch display while the user performs a task using a first touch display.

In addition, technical objects to be achieved by the present disclosure are not limited to the aforementioned object, and those skilled in the art to which the present disclosure pertains may evidently understand other technological objects from the following description.

An electronic device including a plurality of touch displays according to various embodiments of the present disclosure includes a first touch display configured to face a first direction and comprise a first touch panel and a first display panel, a second touch display configured to face a second direction opposite the first direction and comprise a second touch panel and a second display panel, a rotation detection sensor configured to sense a rotation of the electronic device, a processor electrically connected to the first touch display, the second touch display and the rotation detection sensor, and memory electrically connected to the processor. The memory stores instructions which control the processor so that the processor changes each of the first touch panel and the first display panel from an on state to an off state and changes each of the second touch panel and the second display panel from the off state to the on state based on at least one rotation value received from the rotation detection sensor when the electronic device turns on a virtual axis.

According to various embodiments of the present disclosure, a method for changing, by an electronic device, a state, the electronic device including a first touch display configured to face a first direction and to include a first touch panel and a first display panel and a second touch display configured to face a second direction opposite the first direction and to include a second touch panel and a second display panel, includes an operation of controlling the first touch panel and the first display panel so that each of the first touch panel and the first display panel becomes an on state, an operation of sensing a rotation of the electronic device using a rotation detection sensor when the electronic device turns on a virtual axis, and an operation of changing each of the first touch panel and the first display panel from the on state to the off state and changing each of the second touch panel and the second display panel from the off state to the on state based on at least one rotation value sensed in response to the rotation of the electronic device.

A computer-readable non-volatile recording medium according to an embodiment of the present disclosure may store a program which enables an electronic device (or processor) to perform an operation of controlling a first touch panel and first display panel included in a first touch display so that each of the first touch panel and the first display panel becomes an on state, an operation of sensing the rotation of the electronic device using a rotation detection sensor when the electronic device turns on a virtual axis, and an operation of changing each of the first touch panel and the first display panel from the on state to an off state and changing each of a second touch panel and second display panel included in a second touch display from the off state to the on state based on at least one rotation value sensed in response to the rotation of the electronic device.

BRIEF DESCRIPTION OF THE DRAWINGS

FIG. 5A, FIG. 5B and FIG. 5C are diagrams showing electronic devices including a plurality of touch displays according to various embodiments of the present disclosure.

DETAILED DESCRIPTION

Figure 1:
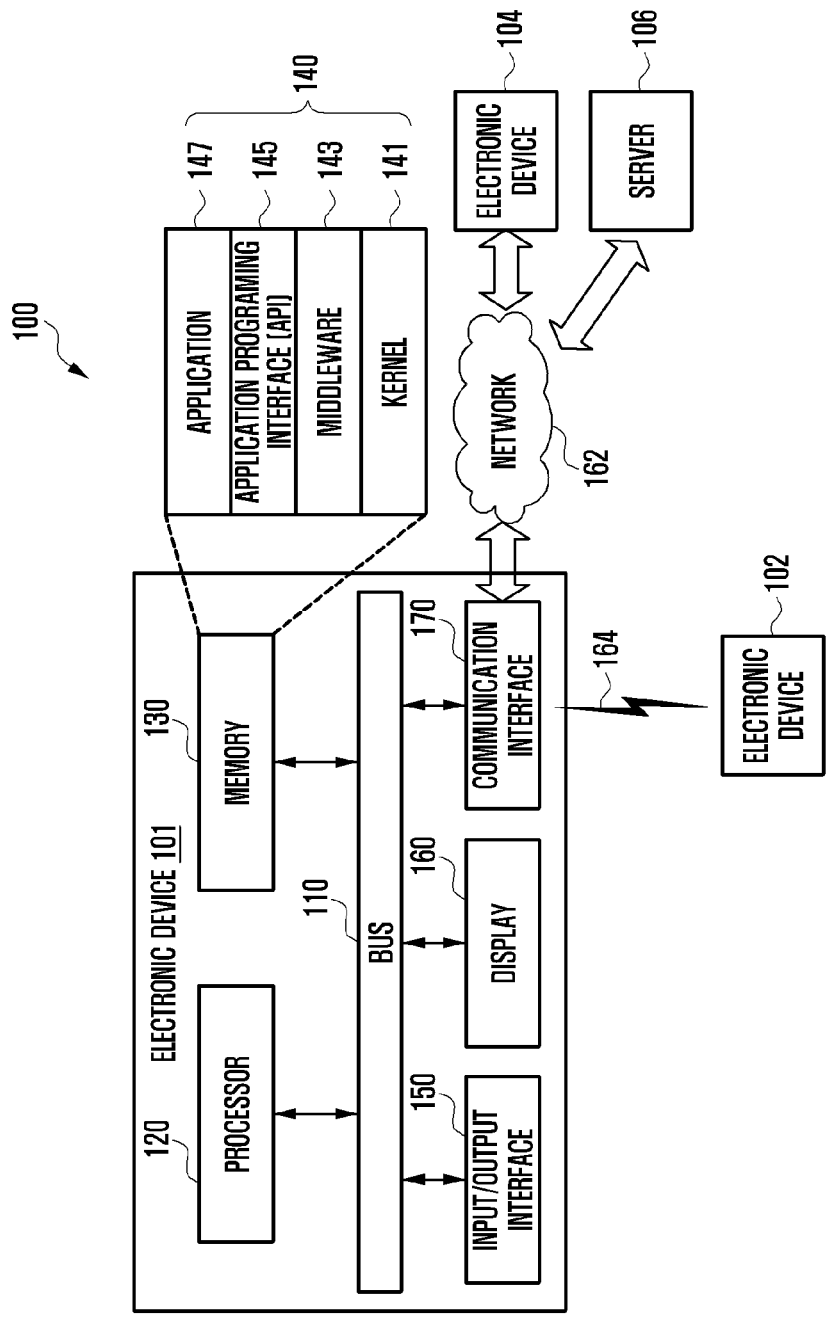
FIG. 1 is a diagram showing a network environment including an electronic device according to various embodiments of the present disclosure.

The following description, with reference to the accompanying drawings, is provided to assist in a comprehensive understanding of an embodiment of the present disclosure as defined by the claims and their equivalents. It includes various specific details to assist in that understanding but are to be regarded as merely exemplary. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

Expressions such as "include" and "may include" which may be used in the present disclosure denote the presence of the disclosed functions, operations, and constituent elements and do not limit one or more additional functions, operations, and constituent elements. In the present disclosure, terms such as "include" and/or "have" may be construed to denote a certain characteristic, number, step, operation, constituent element, component or a combination thereof, but may not be construed to exclude the existence of, or a possibility of, the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element may be referred to as a second element, and similarly, a second element may also be referred to as a first element without departing from the scope of the present disclosure.

In the case where a component is referred to as being "connected" to, or "accessed" by another component, it should be understood that the foregoing is not limited to the component directly connected to or accessed by the other component, but may also include the circumstance where there may also exist another component between them. Meanwhile, in the case where a component is referred to as being "directly connected" or "directly accessed" to another component, it should be understood that there is no component therebetween.

The terms used in the present disclosure are only used to describe specific embodiments, and do not limit the present disclosure. As used herein, the singular forms are intended to include the plural forms as well, unless the context clearly indicates otherwise.

In the present disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD)) such as electronic eyeglasses, electronic clothes, an electronic bracelet, an electronic necklace, an electronic appcessory, or a smart watch).

According to an embodiment of the present disclosure, an electronic device may be a smart home appliance that involves a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

Other embodiments of the electronic device include various medical devices (for example, various kinds of portable medical measuring device (blood glucose meter, heart rate meter, blood pressure meter, or a temperature measuring instrument, etc.), magnetic resonance angiography (MRA), magnetic resonance imaging (MRI), computed tomography (CT), camcorder, etc., navigation (navigation) devices, global positioning system receiver (GPS) receiver, EDR (event data recorder), flight data recorder (FDR), automotive infotainment (infotainment) devices, marine electronic equipment (e.g., marine navigation systems, gyrocompass, etc.), aviation electronics (avionics), security devices, automotive head unit (head unit), industrial or household robots, financial institutions, automatic teller machine (ATM), point of sales (POS) terminals, or Internet of Things (IoT) devices (e.g. light bulbs, various sensors, electric or gas meters, sprinkler systems, fire alarms, thermostat, street lights, toaster, fitness equipment, hot water tank, a heater, a boiler, etc.).

According to an embodiment of the present disclosure, an electronic device may be furniture or a building/structure of the portion, an electronic board, an electronic sign-receiving device (electronic signature receiving device), a projector, or various measuring devices (e.g. water, electricity, gas, or a radio wave measuring equipment, etc.). The electronic device may be one or more combinations of the various devices described above. The electronic device may be a flexible electronic device. In addition, an electronic device is not limited to the above-described device, and may include a new electronic device, in accordance with new technological developments. In this document, the term user refers to a human or an electronic device using the electronic device (for example, an artificial intelligence electronic device).

FIG. 1 is a block diagram illustrating a network environment 100 including an electronic device 101 in accordance with an embodiment of the present disclosure. Referring to FIG. 1, the electronic device 101 includes a bus 110, a processor 120, a memory 130, an input/output interface 150, a display 160, and a communication interface 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 may be used by one or more applications 147.

The API 145 is an interface through which the application 147 is capable of controlling a function provided by the kernel 141 or the middleware 143, and may include, for example, at least one interface or function for file control, window control, image processing, character control, and the like.

The memory can also store instructions that, when executed by the processor, causes the plurality of touch displays to be selectively turned on and off based on the orientation and rotation of the electronic device.

The input/output interface 150 may deliver commands or data, entered by a user through an input/output unit (e.g., a sensor, a keyboard, or a touch screen), to the processor 120, the memory 130, or the communication interface 170 via the bus 110. The input/output unit 150 can include a rotation sensor such as a gyro sensor.

The display 160 may include, for example, a screen such as a liquid crystal display (LCD), a light emitting diode (LED) display, an organic LED (OLED) display, a micro electro mechanical system (MEMS) display, or an electronic paper display. The display 160 may display various types of content (e.g., text, images, videos, icons, or symbols) for users. The display 160 may include a touch panel, and may receive, for example, a touch, gesture, proximity, or hovering input by using an electronic device or a part of the user's body.

The communication interface 170 may perform communication between the electronic device 101 and the electronic device 104 or the server 106. For example, the communication interface 170 may communicate with any external device by being connected with a network 162 through a wired or wireless communication.

The wireless communication may include, but not limited to, at least one of wireless fidelity (WiFi), Bluetooth (BT), near field communication (NFC), global navigation satellite system (GNSS), or a cellular communication (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (Wi-Bro), global system for mobile communications (GSM), etc.). The GNSS may include at least one of global positioning system (GPS), global navigation satellite system (Glonass), Beidou navigation satellite system (Beidou), Galileo, or the European global satellite-based navigation system. Hereinafter, the terms "GPS" and the "GNSS" may be interchangeably used herein. The wired communication may include, at least one of universal serial bus (USB), high definition multimedia interface (HDMI), RS-232 (recommended standard 232), or plain old telephone service (POTS). The network 162 includes, as a telecommunications network at least one of a computer network (e.g., local area network (LAN) or wide area network (WAN)), the Internet, and a telephone network.

The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102, 104 or the server 106. In the case where the electronic device 101 performs a certain function or service automatically or in response to a request, the electronic device 101 may request at least a portion of functions related to the function or service from another electronic device 102, 104 or the server 106 instead of, or in addition to, performing the function or service for itself. The other electronic device 102, 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
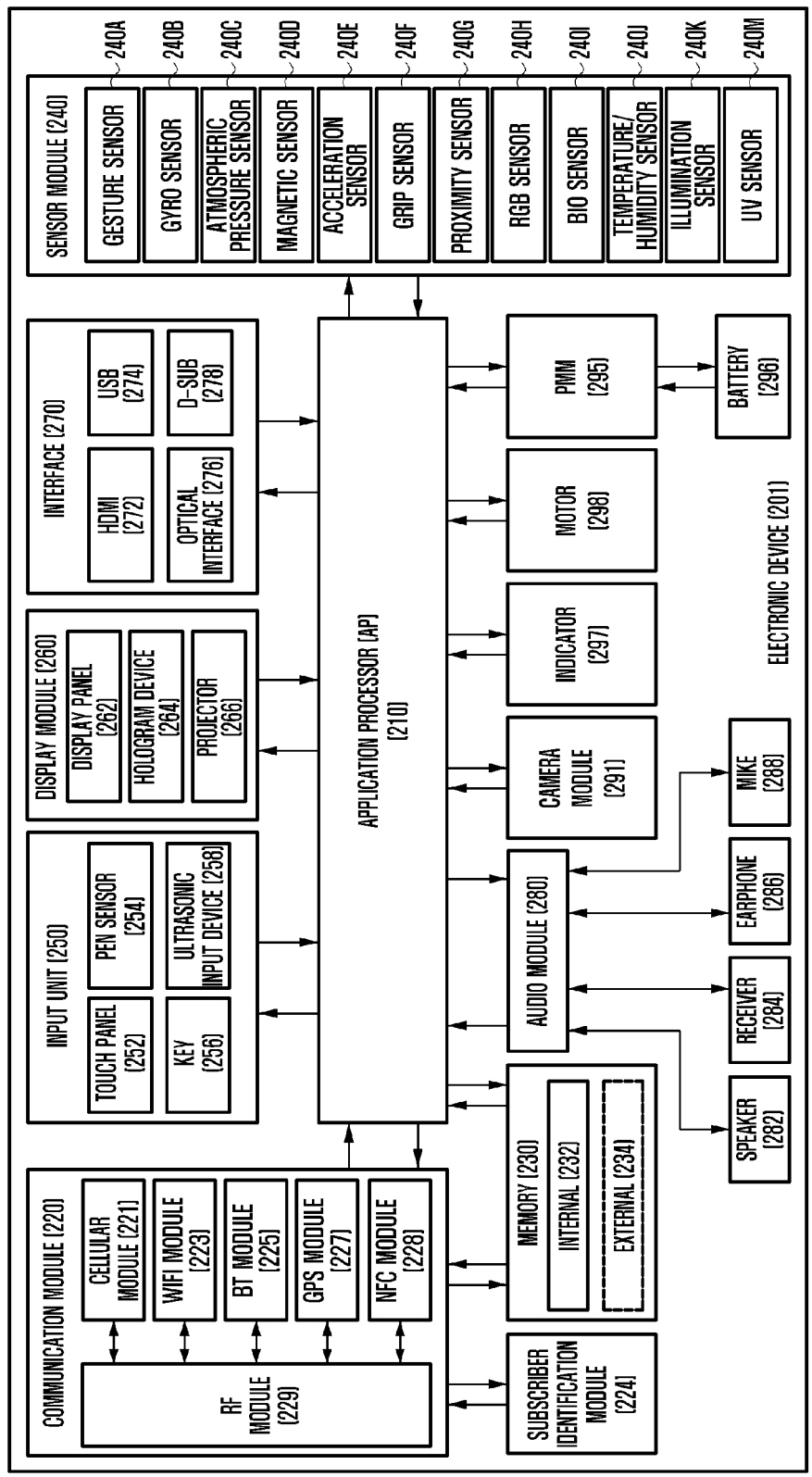
FIG. 2 is a block diagram of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. According to an embodiment of the present disclosure, the AP 210 may further include a graphic processing unit (GPU).

The communication module 220 (e.g., the communication interface 170) may perform data communication with the electronic device 104 or the server 106 connected to the electronic device 201 (e.g., the electronic device 101) through the network. According to an embodiment of the present disclosure, the communication module 220 may include therein a cellular module 221, a WiFi module 223, a BT module 225, a GNSS module 227, an NFC module 228, and an RF (radio frequency) module 229.

The cellular module 221 may offer a voice call, a video call, a message service, an internet service, and the like through a communication network (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (WiBro), global system for mobile communications (GSM), wireless fidelity (Wi-Fi), Bluetooth, and near field communications (NFC) etc.). Additionally, the cellular module 221 may perform identification and authentication of the electronic device in the communication network, using the SIM card 224. According to an embodiment of the present disclosure, the cellular module 221 may perform at least part of functions the AP 210 may provide. For example, the cellular module 221 may perform at least part of a multimedia control function. Each of the WiFi module 223, the BT module 225, the GNSS module 227 and the NFC module 228 may include a processor for processing data transmitted or received. Although FIG. 2 shows the cellular module 221, the WiFi module 223, the BT module 225, the GNSS module 227 and the NFC module 228 as different blocks, at least part of them may be contained in a single IC (integrated circuit) chip or a single IC package.

The RF module 229 may transmit and receive data, e.g., RF signals or any other electric signals. The RF module 229 may include a transceiver, a PAM (power amp module), a frequency filter, an LNA (low noise amplifier), and the like. Although FIG. 2 shows that the cellular module 221, the WiFi module 223, the BT module 225, the GNSS module 227 and the NFC module 228 share the RF module 229, at least one of them may perform transmission and reception of RF signals through a separate RF module.

The SIM card 224 may include, for example, an embedded SIM including a user identification module, and may include unique identification information (e.g., an integrated circuit card identifier (ICCID)) or subscriber information (e.g., international mobile subscriber identity (IMSI)).

The memory 230 includes an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (micro-SD), a mini-secure digital (mini-SD), an extreme digital (xD), a memory stick, and the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 includes, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (red, green, blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

In certain embodiments, the gyro sensor 240B can detect rotation of the electronic device 201.

The input unit 250 includes a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user. The pen sensor 254 (e.g., a digital pen sensor), for example, may be implemented by using a method identical or similar to a method of receiving a touch input from the user, or by using a separate sheet for recognition. For example, a key pad or a touch key may be used similar to the keys 256. The ultrasonic input unit 258 enables the terminal to sense a sound wave by using a microphone 288 of the terminal through a pen generating an ultrasonic signal, and to identify data.

The display 260 (e.g., the display 150) includes a display panel 262, a hologram 264, or a projector 266. The display panel 262 may have a flexible, transparent or wearable form. The display panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the display panel 262, the hologram 264, and the projector 266.

The interface 270 may include, for example, an HDMI (high-definition multimedia interface) 272, a USB (universal serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (mobile high-definition link)

interface, an SD (secure digital) card/MMC (multi-media card) interface, or an IrDA (infrared data association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front sensor or a rear sensor), a lens, an ISP (image signal processor, not shown), or a flash (e.g., LED or xenon lamp, not shown).

The power management module 295 may manage electric power of the electronic device 201. The power management module 295 may include, for example, a PMIC (power management integrated circuit), a charger IC, or a battery charge gauge. The PMIC may be implemented by, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for wireless charging may be further used such as a coil loop, a resonance circuit, or a rectifier. The battery gauge may measure the residual charge amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. The electronic device 201 may include a specific processor (e.g., GPU) for supporting a mobile TV. This processor may process media data that comply with standards of DMB (digital multimedia broadcasting), DVB (digital video broadcasting), or MediaFlo.

Each of the above-discussed elements of the electronic device disclosed herein may be formed of one or more components, and its name may vary according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
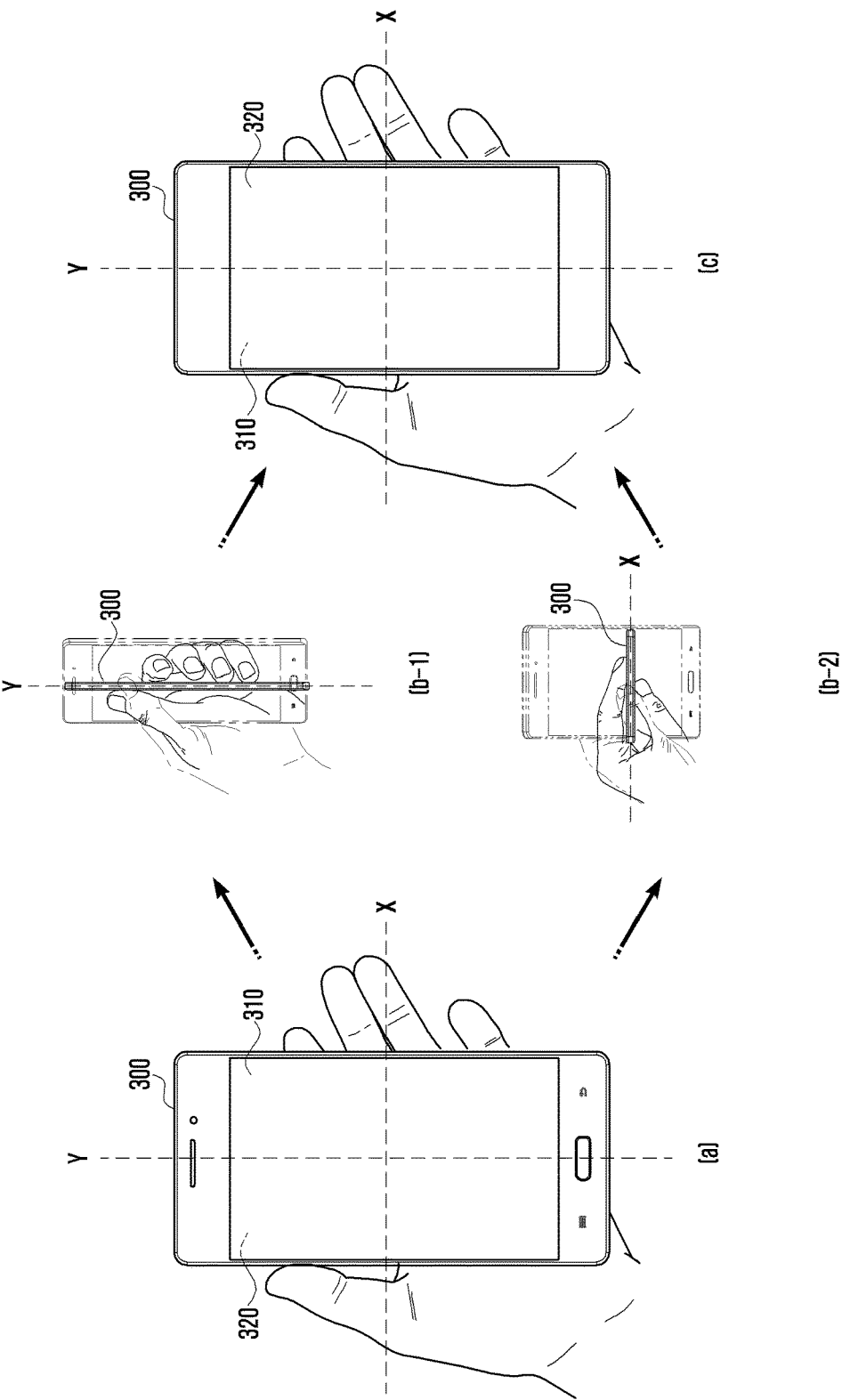
FIG. 3 shows the state in which the electronic device according to various embodiments of the present disclosure is used.

FIG. 3 shows the state in which the electronic device according to various embodiments of this disclosure is used.

In FIG. 3, the electronic device 300 may include a first touch display and a second touch display.

Various types of the electronic device 300 will be described with reference to FIGS. 5A to 5C. The electronic device 300 may include part of or the entire electronic device 101 shown in FIG. 1. Alternatively, the electronic device 300 may include part of or the entire electronic device 201 shown in FIG. 2.

Furthermore, in the present disclosure, the first touch display 310 may be called a main touch display or front touch display, and the second touch display 320 may be called a sub-touch display or back touch display.

Furthermore, a first display panel included in the first touch display 310 may be called a main display panel or front display panel, and a first touch panel included in the first touch display 310 may be called a main touch panel or front touch panel.

Furthermore, a second display panel included in the second touch display 320 may be called a sub-display panel or back display panel, and a second touch panel included in the second touch display 320 may be called a sub-touch panel or back touch panel.

The main touch display or front touch display may be the touch display of a surface in which for example, a home button or a speaker has been located.

First, in FIG. 3(a), a user may hold the electronic device 300 so that the first touch display 310 faces a first direction and the second touch display 320 faces a second direction, that is, a direction opposite the first direction. The first direction may be a direction that faces the user's line of sight, for example. The second direction may be a direction facing the user's palm, that is, the direction opposite the first direction, for example. Furthermore, an angle between the first direction and the second direction may be at least some of values in the range of 150° to 210°, for example, and may be preferably 180°.

In this situation, the first display panel and first touch panel included in the first touch display 310 that faces the first direction may be an on state.

The on state of the first display panel may include the state in which information is displayed on a display panel of the first touch display 310, for example. Alternatively, the on state of the first display panel may include the state in which the first display panel is activated, the backlight is on, the first display panel is powered on or at least some of organic light-emitting diode (OLED) pixels forming the first display panel are on.

Furthermore, the on state of the first touch panel may include the state in which information about touch input of a user through the first touch panel is processed. That is, a touch input is detected, and for example, objects displayed at the location of the touch are, for example, selected in a manner analogous to double-clicking with a mouse. Alternatively, the on state of the first touch panel may include the state in which the first touch panel is activated or the amount of charges provided by the first touch panel is a specific value or more so that the first touch panel senses a touch.

In FIG. 3(b-1), the user may turn the electronic device 300 about a vertical axis Y (or may turn the electronic device 300 over such that the left and right edges swap). Alternatively, in FIG. 3(b-2), the user may turn the electronic device 300 about a horizontal axis X (or may turn the electronic device 300 over such that the top and bottom edges swap). The turning of the electronic device about an axis may include the first touch display 310 turns to face the second direction on the basis of the axis and the second touch display 320 turns to face the first direction on the basis of the axis. For purposes of this document, the vertical axis Y shall be considered the axis that traverses the electronic device through the center along its longer dimension, while the horizontal axis shall be considered the axis that traverses through the center of the electronic device along the shorter dimension. When the electronic device 300 turns about the axis, the rotation detection sensor of the electronic device 300 may sense the rotation of the electronic device 300.

The rotation detection sensor may include at least one of a gyro sensor 240B which senses angular velocity and a rotation angle of the electronic device 300 and an acceleration sensor 240E which senses the acceleration of the electronic device 300, for example.

In this case, the rotation detection sensor may sense the rotation of the electronic device 300 while the electronic device 300 starts to rotate and the rotation is completed.

The electronic device 300 may change each of the first display panel and the first touch panel, included in the first touch display 310, from the on state to the off state based on a rotation value sensed according to the rotation of the electronic device 300. Furthermore, the electronic device 300 may change each of the second display panel and the second touch panel, included in the second touch display 320, from the off state to the on state. In this case, the rotation value may be at least one of a value of angular velocity, a value of the angle of rotation and a value of the acceleration of gravity, for example.

When the rotation of the electronic device 300 is completed, the user may hold the electronic device 300 so that the first touch display 310 faces the second direction and the second touch display 320 faces a direction opposite the second direction, that is, the first direction that is facing the direction of the user's line of sight, as in FIG. 3(c).

In this case, the second display panel and second touch panel included in the second touch display 320 may be in the on state.

In contrast, the first display panel and first touch panel included in the first touch display 310 may be in the off state.

In this case, the off state of the first display panel may include the state in which no information is displayed on a screen of the first touch display 310, for example. Alternatively, the off state of the first display panel may include the state in which the first display panel is deactivated, the first display panel is powered off, organic light-emitting diode (OLED) pixels forming the first display panel are turned off, it is difficult to identify information on a screen of the first touch display 310 with the naked eye because the output voltage of a lamp driver which controls brightness of the pixels is low, or the display panel of the first touch display 310 is displayed as all black pixels.

Alternatively, the off state of the first display panel may include the state in which no information is displayed on most (85% or more) of the display panel of the first touch display 310. For example, if the first display panel is a flexible display panel and divided into a main region that occupies most of a screen and an edge region that occupies part of a screen, the first display panel may be said to be the off state although information is not displayed in the main region, but information is displayed in the edge region.

The off state of the first touch panel may include the state in which information about touch input of a user through the first touch panel is not processed, for example. Alternatively, the off state of the first touch panel may include the state in which the first touch panel is deactivated, the amount of charges provided by the first touch panel is limited to a specific value or less so that the first touch panel does not sense a touch, or at least one of elements related to touch sensing is deactivated. Alternatively, the off state of the first touch panel may include the state in which the processor of the electronic device 300 performs null processing on an output value regarding touch input or does not provide any feedback corresponding to the touch input although it receives information regarding the touch input (e.g., a touch location, a touch direction or a touch time) from the first touch panel.

Although FIG. 3 shows the electronic device 300 turning about a stationary axis X or Y, it is noted that the electronic device 300 can turn about a moving axis such as when revolving. In certain embodiments, the gyro sensor 240B and the acceleration sensor 240E can provide values to the processor. The processor can use the foregoing values to translate the revolution as a rotation about a stationary axis. Therefore, rotation shall also be understood to include angular movement about a moving axis.

Figure 4:
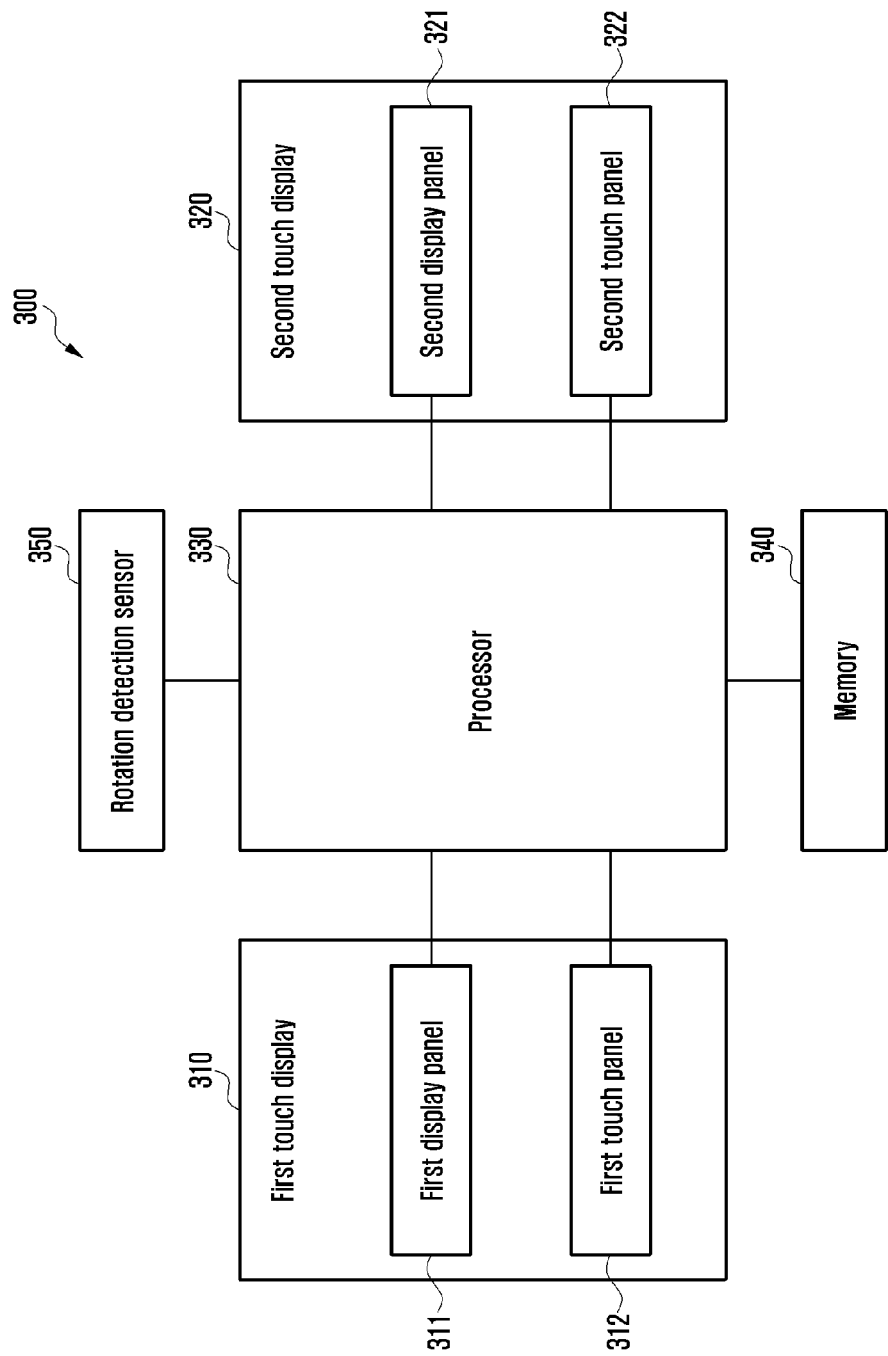
FIG. 4 is a block diagram of an electronic device according to various embodiments of the present disclosure.

FIG. 4 is a block diagram of the electronic device 300 according to various embodiments of the present disclosure.

The electronic device 300 according to various embodiments of the present disclosure may be at least one of the aforementioned electronic devices 101 and 201. A description of elements identical with or similar to the elements of the aforementioned electronic device is omitted.

Referring to FIG. 4, the electronic device 300 according to various embodiments of the present disclosure may include a processor 330, a first touch display 310, a second touch display 320, a rotation detection sensor 350 and memory 340.

The first touch display 310 and the second touch display 320 may include part of or the entire touch panel 262 and display panel 266 of a first one of the plurality of displays 260.

The first touch display 310 may include a first display panel 311 and a first touch panel 312. The first display panel 311 may receive an output signal from the processor 330 and display information. Furthermore, the first touch panel 312 may transfer an input signal, generated by a touch of a user, to the processor 330.

The second touch display 320 may include a second display panel 321 and a second touch panel 322. The second display panel 321 may receive an output signal from the processor 330 and display information. Furthermore, the first touch panel 322 may transfer an input signal, generated by a touch of a user, to the processor 330.

The first touch display 310 and the second touch display 320 may constitute a continuous planar screen viewable from a common direction and touch panel thereon, or thereunder. For example, a set of OLEDs that are directly connected to each other forming a planar surface viewable from a common direction and touch panel thereon, can be considered a first touch display, while another set of OLEDs forming a planar surface and touch panel thereon along the same plane as the first touch display that are not connected to the first touch display or connected by an element that is not an OLED may be considered a second touch display. Additionally, in a set of OLEDs and a touch panel thereon initially forming a planar surface and touch panel thereon, that is bent, such that a portion of the OLEDs and the touch panel forms a first planar surface and another portion of the OLEDs and the touch panel forms a second planar surface, that portion of the OLEDs and touch panel that forms the first planar surface shall be deemed one touch display, and that portion of the OLEDs and touch panel that forms the second planar surface shall be deemed another touch display.

The rotation detection sensor 350 may generate a rotation value by sensing the rotation of the electronic device 300.

The rotation detection sensor 350 may include at least one of a gyro sensor 240B which senses the rotation speed of the electronic device 300 and an acceleration sensor 240E which senses the acceleration of the electronic device 300 when the electronic device 300 turns on an axis. The characteristics of the gyro sensor 240B and the acceleration sensor 240E will be described later in detail with reference to FIG. 6.

If the rotation detection sensor 350 includes the gyro sensor 240B, the rotation detection sensor 350 may generate at least one of a value of angular velocity and a value of the angle of rotation according to the rotation of the electronic device 300 as a rotation value. In this case, at least part of the rotation value may be generated by the processor 330. For example, when the rotation detection sensor 350 transfers the value of angular velocity to the processor 330, the processor 330 may generate the value of the angle of rotation by integrating the value of angular velocity.

Furthermore, if the rotation detection sensor 350 includes the acceleration sensor 240E, the rotation detection sensor 350 may generate a value of the acceleration according to the rotation of the electronic device 300 as a rotation value.

The processor 330 may control the overall operation and function of the electronic device 300. The processor 330 may include part of or the entire processor 120 of FIG. 1. Alternatively, the processor 330 may include part of or the entire processor 210 of FIG. 2.

The processor 330 may be electrically connected to the first touch display 310, the second touch display 320 and the rotation detection sensor 350. Furthermore, the processor 330 may be electrically connected to the memory 340 and may fetch an instruction stored in the memory 340. When the electronic device turns on about an axis, the processor 330 may change each of the first touch panel 312 and the first display panel 311 from the on state to the off state and change each of the second touch panel 322 and the second display panel 321 from the off state to the on state based on at least one rotation value received from the rotation detection sensor 350 in accordance with operation based on the fetched instruction.

The memory 340 may be electrically connected to the processor 330. The memory 340 may store instructions capable of driving the processor.

In accordance with various embodiments, the memory may store instructions that control the processor 330 so that it changes each of the first touch panel 312 and the first display panel 311 from the on state to the off state and it changes each of the second touch panel 322 and the second display panel 321 from the off state to the on state based on at least one rotation value received from the rotation detection sensor 350 when the electronic device 300 turns on the axis.

In accordance with various embodiments, if the rotation detection sensor 350 includes the gyro sensor 240B, the memory 340 may store instructions that control the processor 330 so that it changes each of the first touch panel 312 and the first display panel 311 from the on state to the off state and it changes each of the second touch panel 322 and the second display panel 321 from the off state to the on state if a value of angular velocity sensed by the gyro sensor is a first critical value or more and an acceleration value sensed by the acceleration sensor is a second critical value or more.

In accordance with various embodiments, the memory 340 may store instructions that control the processor 330 so that it changes each of the first touch panel and the first display panel from the on state to the off state and it changes each of the second touch panel and the second display panel from the off state to the on state if a rotation time of the electronic device 300 is a critical time or more.

In accordance with various embodiments, the memory 340 may store instructions that control the processor 330 so that it deactivates a screen change function for providing a change between a horizontal mode screen and a portrait mode screen based on at least one rotation value received from the rotation detection sensor when the electronic device 300 turns on the virtual axis.

Figure 5A:
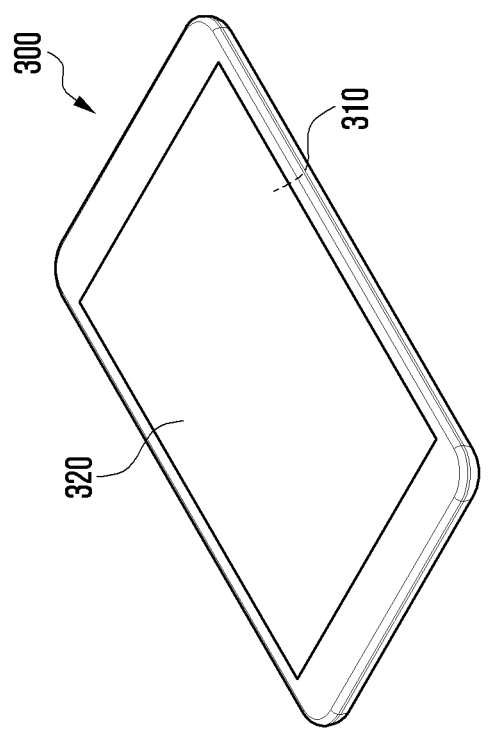
Figure 5A:
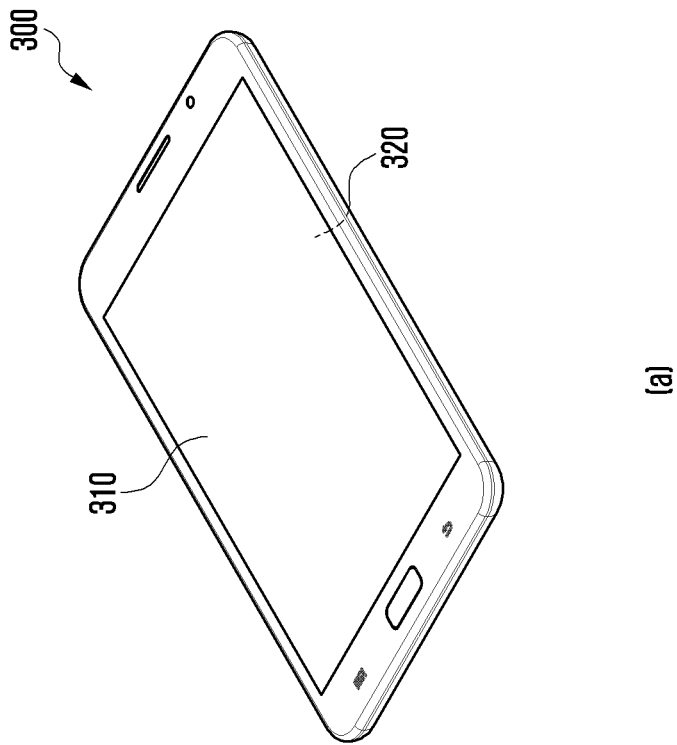
Figure 5B:
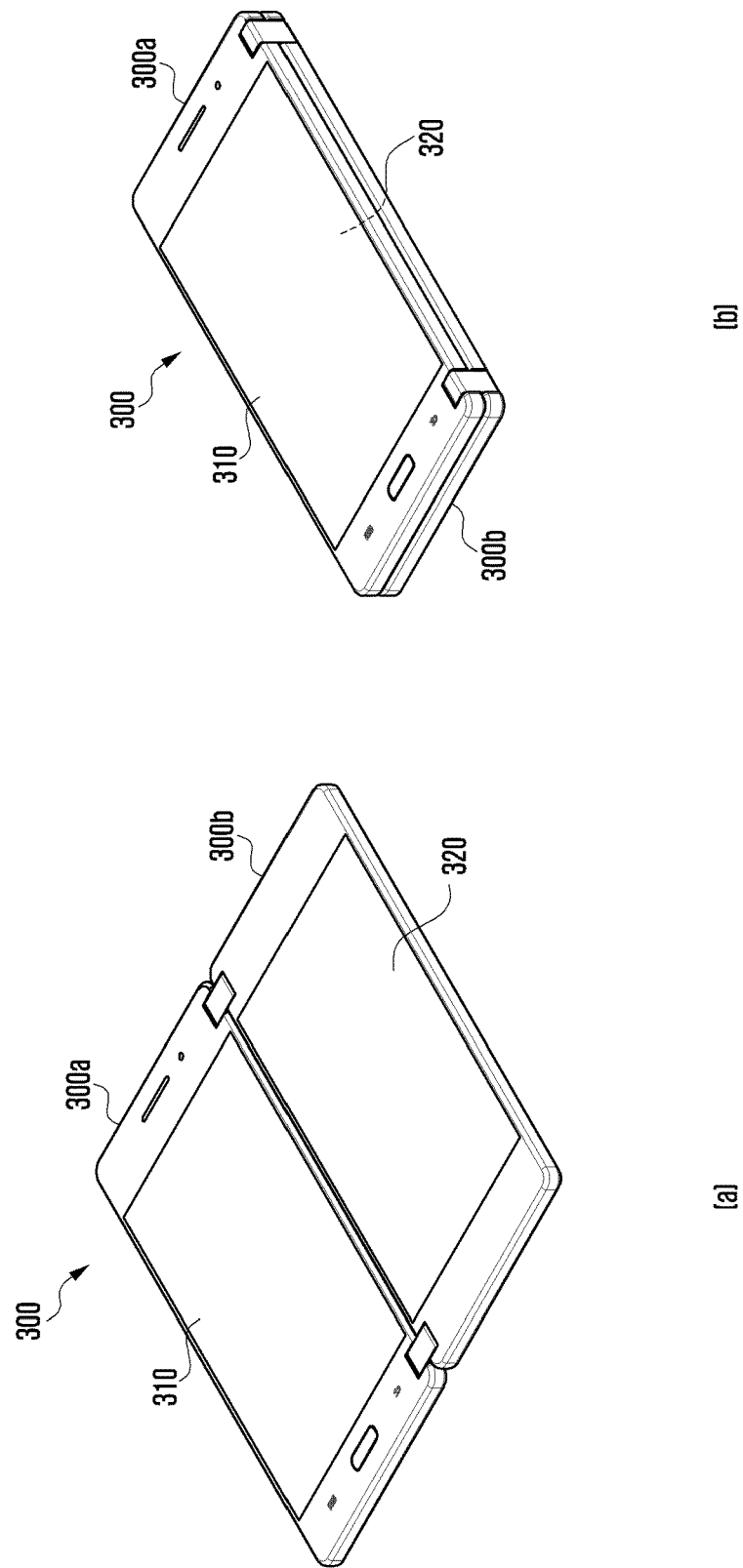

FIGS. 5A to 5C are diagrams showing electronic devices including a plurality of touch displays according to various embodiments of the present disclosure.

FIG. 5A is a diagram showing the electronic device 300 including touch displays on both sides (the front and the back). (a) of FIG. 5A is a diagram showing the front of the electronic device 300, and (b) of FIG. 5A is a diagram showing the back of the electronic device 300.

In FIG. 5A, the first touch display 310 may be provided on the front of the electronic device 300 and the second touch display 320 may be provided on the back of the electronic device 300.

FIG. 5B is a diagram showing the electronic device 300 of a foldable type. In FIG. 5B, the first housing 300a and second housing 300b of the electronic device 300 may be folded together by a hinge or a polymer layer.

For example, the electronic device 300 shown in (a) of FIG. 5B may be folded as in (b) of FIG. 5B. In this case, the first touch display 310 and the second touch display 320 may be exposed to the outside.

FIG. 5C is a diagram showing the electronic device of a bendable type including a flexible display. When the electronic device 300 shown in (a) of FIG. 5C is folded back as in (b) of FIG. 5C, a flexible display 500 included in the electronic device of (b) of FIG. 5C may be divided into the first touch display 310 and the second touch display 320. As can be seen, that portion of the OLEDs and touch panel thereon 310 form a first planar surface, and the portion of OLEDs and the touch panel thereon 320 form a second planar surface. For example, the area of a surface that belongs to the flexible display and in which a speaker or a front camera is located may become the first touch display 310, and the area of a surface that belongs to the flexible display and in which a home button or menu buttons are located may become the second touch display 320.

If the first touch display 310 and the second touch display 320 are located in opposite directions as in FIGS. 5A to 5C, a user turns the electronic device 300 over so that the first touch display 310 faces the back in the state in which the first touch display 310 originally faced the front. Alternatively, the user may turn the electronic device over so that the second touch display 320 faces the back in the state in which the second touch display 320 originally faced the front.

In this case, in accordance with an embodiment of the present disclosure, the electronic device 300 may change each of the first touch panel and first display panel, included in the first touch display 310, from the on state to the off state and change each of the second touch panel and second display panel, included in the second touch display 320, from the off state to the on state based on at least one rotation value received from the rotation detection sensor.

Figure 6:
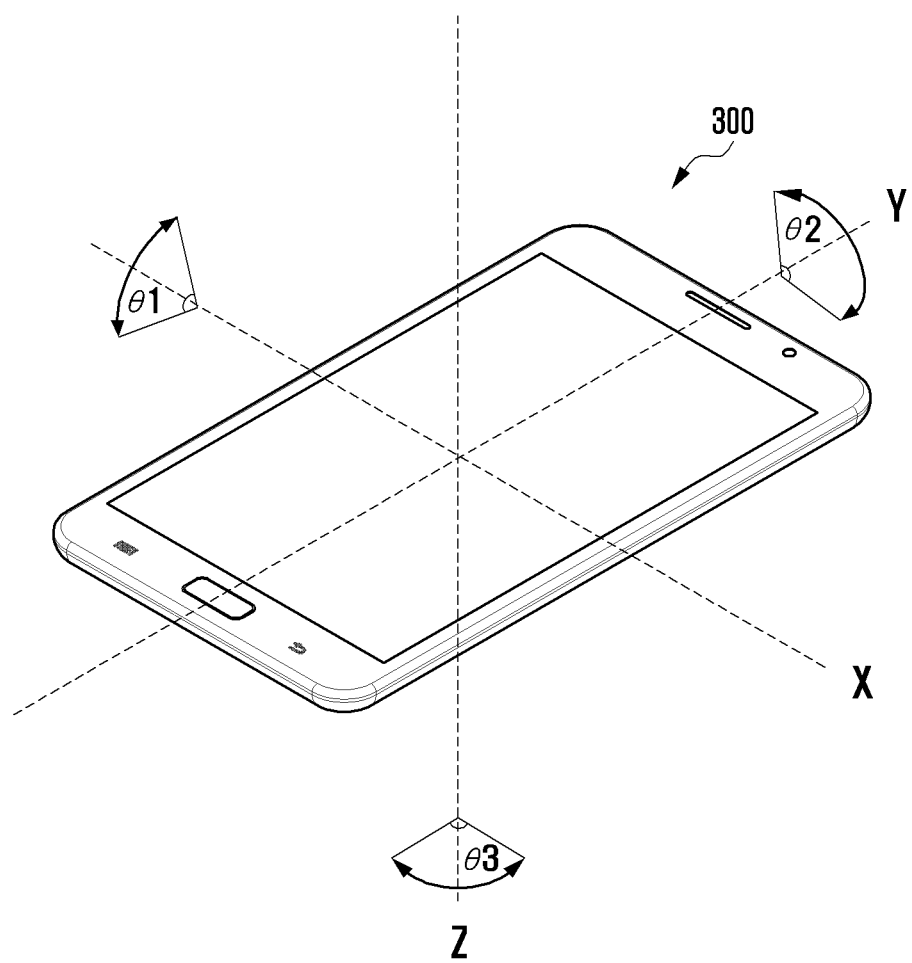
FIG. 6 is a diagram showing the rotation of the electronic device according to an embodiment of the present disclosure.

FIG. 6 is a diagram showing the rotation of the electronic device 300 according to an embodiment of the present disclosure.

In FIG. 6, the rotation detection sensor included in the electronic device 300 may sense the rotation of the electronic device 300 using at least one of various sensors, such as the gyro sensor and the acceleration sensor.

The rotation detection sensor may sense the rotation of the electronic device 300 and transfer a rotation value, measured based on the results of the sensing, to the processor of the electronic device 300.

For example, if the rotation detection sensor includes the gyro sensor, the gyro sensor may sense angular velocity indicative of a change in the angle per time with respect to each of the virtual axes: the horizontal axis X, the vertical axis Y and the depth axis Z according to the rotation of the electronic device 300. Furthermore, the gyro sensor may sense (or calculate or obtain) the rotation angle of each of the horizontal axis X, the vertical axis Y and the depth axis Z by integrating a change in the angle per time. The rotation angle of the gyro sensor may be expressed by a roll angle θ1, a pitch angle θ2 and a yaw angle θ3, respectively. The roll angle θ1 may indicate a rotation angle around the horizontal axis in FIG. 6. The pitch angle θ2 may indicate a rotation angle around the vertical axis in FIG. 6. The yaw angle 83 may indicate a rotation angle around the depth axis in the FIG. 6.

For example, if the rotation detection sensor includes the acceleration sensor, the acceleration sensor may sense the acceleration of each of the virtual axes: the horizontal axis X, the vertical axis Y and the depth axis Z according to the rotation of the electronic device 300. The acceleration sensor measures acceleration that is the sum of the motion acceleration of the electronic device 300, but may measure only the acceleration due to gravity (g force) if there is no movement of the electronic device 300. For example, it may be assumed that the direction of the front that the main touch display of the electronic device 300 faces is the positive (+) direction of gravity and the direction of the back that the sub-touch display of the electronic device 300 faces is the negative (−) direction of gravity.

In this case, if the back of the electronic device 300 has been placed to touch a plane parallel to the ground, the acceleration of gravity measured by the acceleration sensor may be 0 m/sec$^2$ in the horizontal axis and vertical axis components and may be a specific positive value (e.g., +9.8 m/sec$^2$) in the depth axis component only. In contrast, if the front of the electronic device 300 has been placed to touch a plane parallel to the ground, the acceleration of gravity measured by the acceleration sensor may be 0 m/sec$^2$ in the horizontal axis and vertical axis components and may be a specific negative value (e.g., −9.8 m/sec$^2$) in the depth axis component only.

Furthermore, assuming that the electronic device 300 is held at an oblique angle, the g force measured by the acceleration sensor may be a value other than 0 m/sec$^2$ in the X axis and Y axis components. In addition, each of the axes and a corresponding g force may be changed depending on the location to which the sensor has been attached.

A rotation value, such as angular velocity, a rotation angle or the g force sensed by the rotation detection sensor, may be transferred to the processor.

Accordingly, the processor may change each of the first touch panel and the first display panel from the on state to the off state and change each of the second touch panel and the second display panel from the off state to the on state based on the sensed rotation value.

Figure 7:
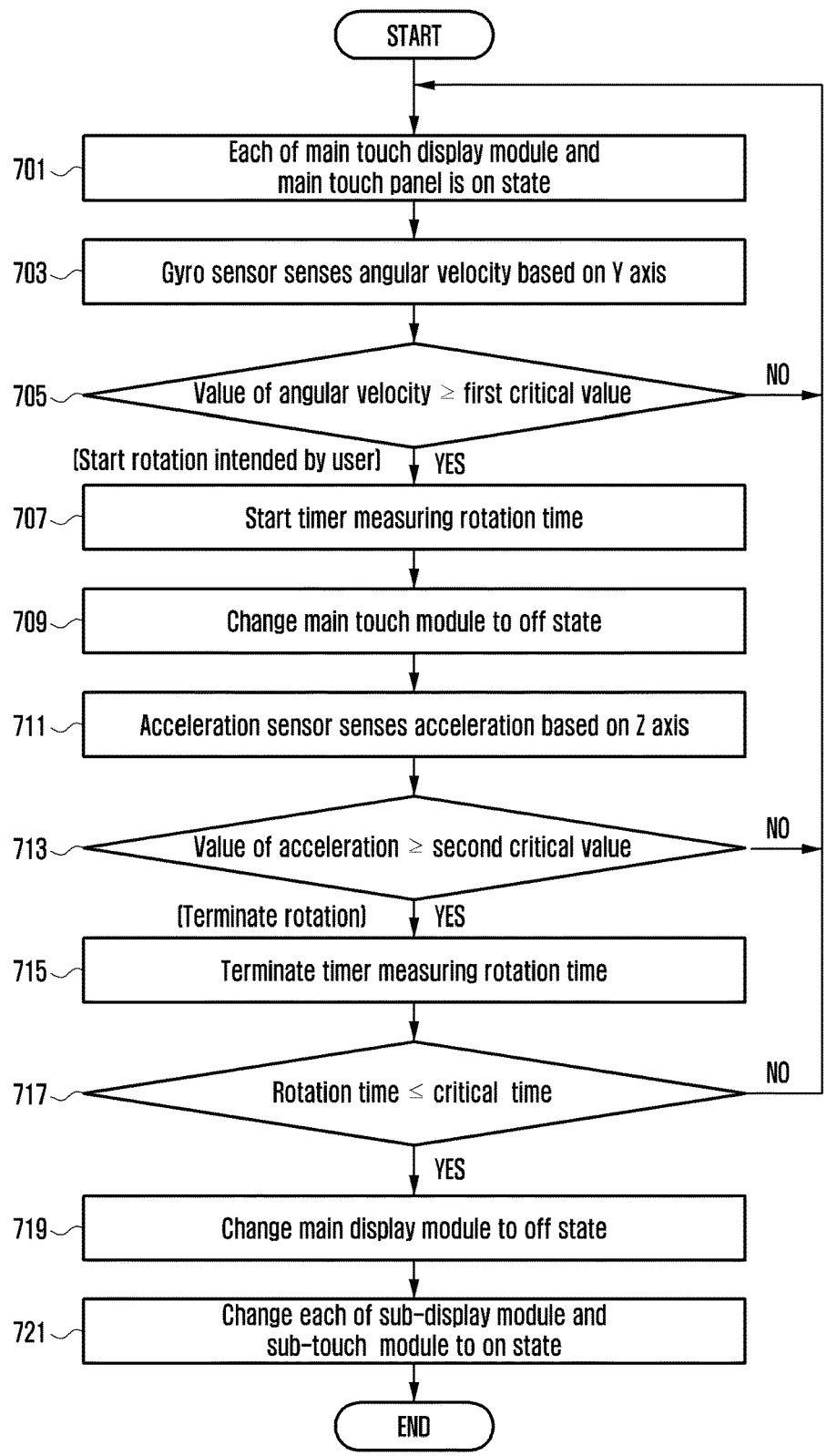
FIG. 7, FIG. 8, FIG. 9 and FIG. 10 are flowcharts illustrating an operation of the electronic device whose state switches according to an embodiment of the present disclosure.

FIG. 7 is a flowchart illustrating an operation of the electronic device 300 whose state switches according to an embodiment of the present disclosure.

In FIG. 7, the main display panel and main touch panel of the electronic device 300 may be the on state, respectively (701). In this case, the sub-display panel and the sub-touch panel may be the off state, respectively.

In this situation, the electronic device 300 may turn on the vertical axis.

While the electronic device 300 turns on the vertical axis, the gyro sensor of the electronic device 300 may sense angular velocity of the electronic device on the basis of the vertical axis (703).

The electronic device 300 may determine whether the value of the angular velocity based on the vertical axis is a first critical value or more (705).

In this case, the first critical value may be at least one of values in the range of 1 radian (rad)/sec to 3 rad/sec, for example, and may be preferably a value of close to 2 rad/sec.

If the value of the angular velocity based on the vertical axis is the first critical value or more, the electronic device 300 may determine that the rotation of the electronic device 300 intended by a user has started.

In accordance with various embodiments, the electronic device 300 may further determine whether a value of the angle of rotation of the electronic device 300 is a critical angle or more. The angle of rotation may be the integral value of angular velocity. The critical angle may be at least one of values in the range of 20° to 40°, for example, and may be preferably 30°.

In this case, the electronic device 300 may determine whether both the value of the angular velocity and value of the angle of rotation of the electronic device 300 are the critical value or more. If both the value of the angular velocity and value of the angle of rotation of the electronic device 300 are the critical value or more, the electronic device 300 may determine that the rotation of the electronic device 300 intended by the user has started. Alternatively, if one of the value of the angular velocity and the value of the angle of rotation is the critical value or more, the electronic device 300 may determine that the rotation of the electronic device 300 intended by the user has started.

If the rotation of the electronic device 300 intended by the user has started, the electronic device 300 may start a timer which measures a rotation time (707) and change the main touch module from the on state to the off state (709).

However, if the value of the angular velocity based on the vertical axis is less than the first critical value, the electronic device 300 may determine that the rotation of the electronic device 300 is not intended by the user to completely turn over the electronic device 300 and maintain each of the main display panel and main touch panel of the electronic device 300 in the on state.

Next, the acceleration sensor of the electronic device 300 may sense an acceleration of the electronic device on the basis of the depth axis (711).

The electronic device 300 may determine whether the value of the acceleration based on the depth axis is a second critical value or more (713).

In this case, the second critical value may be at least one of values in the range of 2 m/sec$^2$ to 5 m/sec$^2$, for example, and may be preferably 3 m/sec$^2$. Alternatively, the second critical value may be at least one of values in the range of −5 m/sec$^2$ to −2 m/sec$^2$ and may be preferably −3 m/sec$^2$.

If the value of the acceleration based on the depth axis is the second critical value or more, the electronic device 300 may determine that the rotation of the electronic device has been terminated.

Accordingly, the electronic device 300 may terminate the timer which measures the rotation time (715).

However, if the value of the acceleration based on the depth axis is less than the second critical value, the electronic device 300 may determine that the rotation of the electronic device 300 is not intended to turn over the electronic device 300 by the user and maintain each of the main display panel and main touch panel of the electronic device 300 in the on state.

If the value of the acceleration based on the depth axis is the second critical value or more, the electronic device 300 may determine the rotation time of the electronic device 300 based on the time counted by the timer.

The electronic device 300 may determine whether the determined rotation time of the electronic device 300 is a critical time or less (717).

In this case, the critical time may be at least one of values 100 ms to 300 ms, for example, and may be preferably about 200 ms.

If the rotation time is the critical time or less, the electronic device 300 may determine that the rotation of the electronic device 300 is a rotation intended by the user.

However, if the rotation time exceeds the critical time, the electronic device 300 may determine that the rotation of the electronic device 300 is not intended by the user to turn over the electronic device 300 and maintain each of the main display panel and main touch panel of the electronic device 300 in the on state.

If the rotation time is the critical time or less, the electronic device 300 may generate an event for changing the state of the touch display of the electronic device 300.

In response to the generated event, the electronic device 300 may change the main display panel from the on state to the off state (719).

Furthermore, in response to the generated event, the electronic device 300 may change each of the sub-display panel and the sub-touch panel from the off state to the on state (721).

Figure 8:
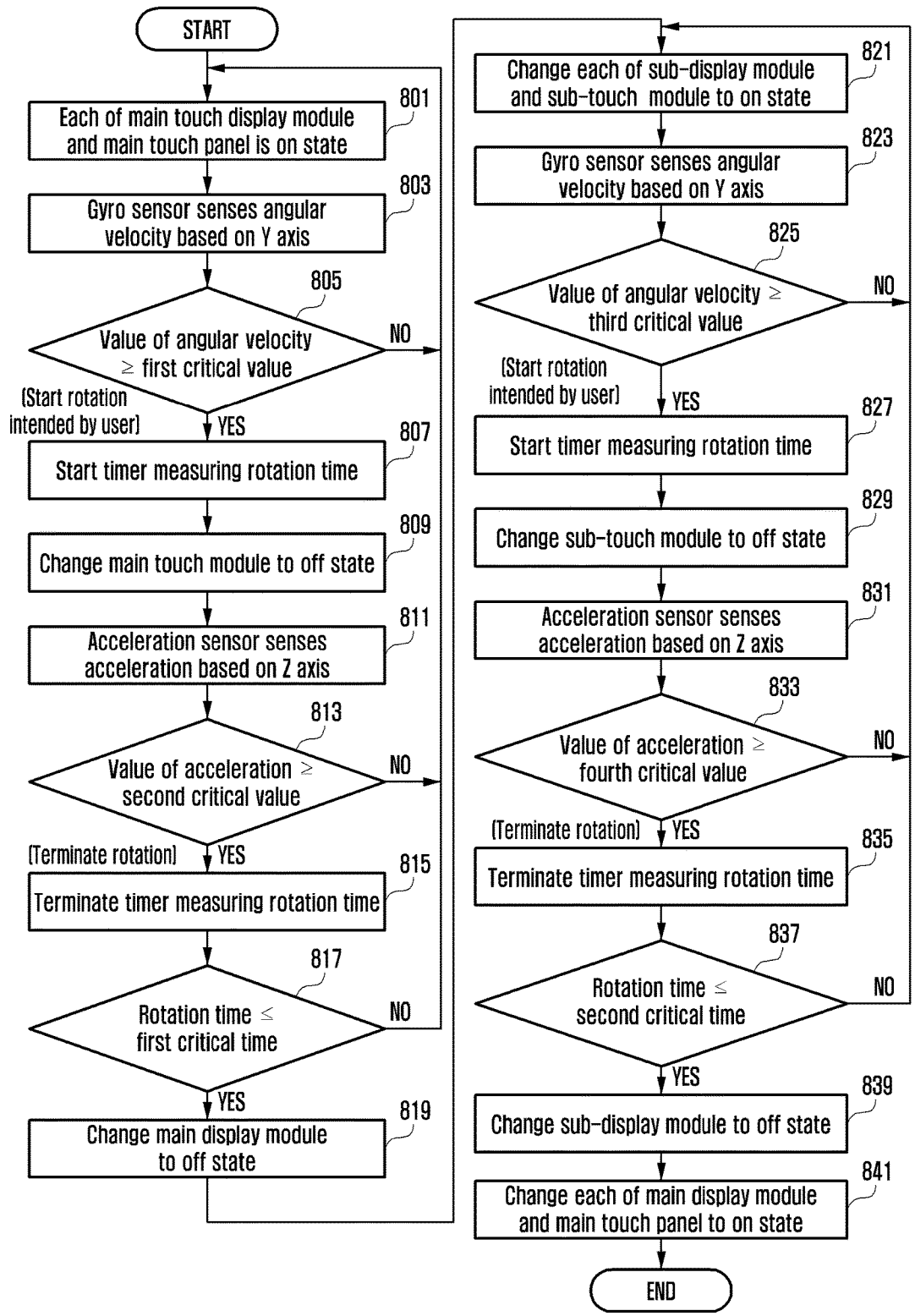

FIG. 8 is a flowchart illustrating an operation of the electronic device whose state switches according to another embodiment of the present disclosure.

In FIG. 8, an operation 801 to an operation 819 correspond to the operation 701 to operation 719 of FIG. 7.

In response to the rotation by the user, the electronic device 300 may change each of the sub-display panel and the sub-touch panel from the off state to the on state (821). In this case, the front of the sub-touch display including the sub-display panel and the sub-touch panel may face the user.

In this situation, the electronic device 300 may turn on the vertical axis again.

While the electronic device 300 turns on the vertical axis, the gyro sensor of the electronic device 300 may sense angular velocity of the electronic device on the basis of the vertical axis (823).

The electronic device 300 may determine whether the value of the angular velocity based on the vertical axis is a third critical value or more (825).

In this case, the third critical value may be a value identical with or similar to the first critical value of the operation 805.

If the value of the angular velocity based on the vertical axis is the third critical value or more, the electronic device 300 may determine that the rotation of the electronic device 300 intended by the user has started.

Accordingly, the electronic device 300 may start a timer which measures a rotation time (827) and change the sub-touch module from the on state to the off state (829).

However, if the value of the angular velocity based on the vertical axis is less than the third critical value, the electronic device 300 may determine that the rotation of the electronic device 300 is not intended by the user to turn over the electronic device 300 and maintain each of the sub-display panel and sub-touch panel of the electronic device 300 in the on state.

Next, the acceleration sensor of the electronic device 300 may sense an acceleration of the electronic device on the basis of the depth axis (831).

The electronic device 300 may determine whether the acceleration value based on the depth axis is a fourth critical value or more (833).

In this case, the fourth critical value may be a value identical with or similar to the second critical value of the operation 813.

If the acceleration value based on the depth axis is the fourth critical value or more, the electronic device 300 may determine that the rotation of the electronic device has been terminated.

Accordingly, the electronic device 300 may terminate the timer which measures the rotation time (835).

However, if the acceleration value based on the depth axis is less than the fourth critical value, the electronic device 300 may determine that the rotation of the electronic device 300 is not intended by the user to turn over the electronic device 300 and maintain each of the sub-display panel and sub-touch panel of the electronic device 300 in the on state.

If the acceleration value based on the depth axis is the fourth critical value or more, the electronic device 300 may determine the rotation time of the electronic device 300 based on the time counted by the timer.

The electronic device 300 may determine whether the determined rotation time of the electronic device 300 is a second critical time or less (837).

In this case, the second critical time may be a value identical with or similar (within 2%) to the first critical time of the operation 817.

If the rotation time is the second critical time or less, the electronic device 300 may determine that the rotation of the electronic device 300 is a rotation intended by the user to turn the electronic device 300 over.

However, if the rotation time exceeds the second critical time, the electronic device 300 may determine that the rotation of the electronic device 300 is not a rotation intended by the user to turn over the electronic device 300 and maintain each of the sub-display panel and sub-touch panel of the electronic device 300 in the on state.

If the rotation time is the second critical time or less, the electronic device 300 may change the sub-display panel from the on state to the off state (839).

Furthermore, the electronic device 300 may change each of the main display panel and the main touch panel from the off state to the on state again (841).

In this case, the operation 841 may correspond to the operation 801. Accordingly, the state of the plurality of touch displays of the electronic device may continue to switch in response to the rotation of the electronic device 300. That is, in response to the rotation of the electronic device 300, the main display panel and the main touch panel may switch from the on state to the off state. In response thereto, the sub-display panel and the sub-touch panel may switch from the off state to the on state. Furthermore, in response to the rotation of the electronic device 300, the sub-display panel and the sub-touch panel may switch from the on state to the off state. In response thereto, the main display panel and the main touch panel may switch from the off state to the on state.

Figure 9:
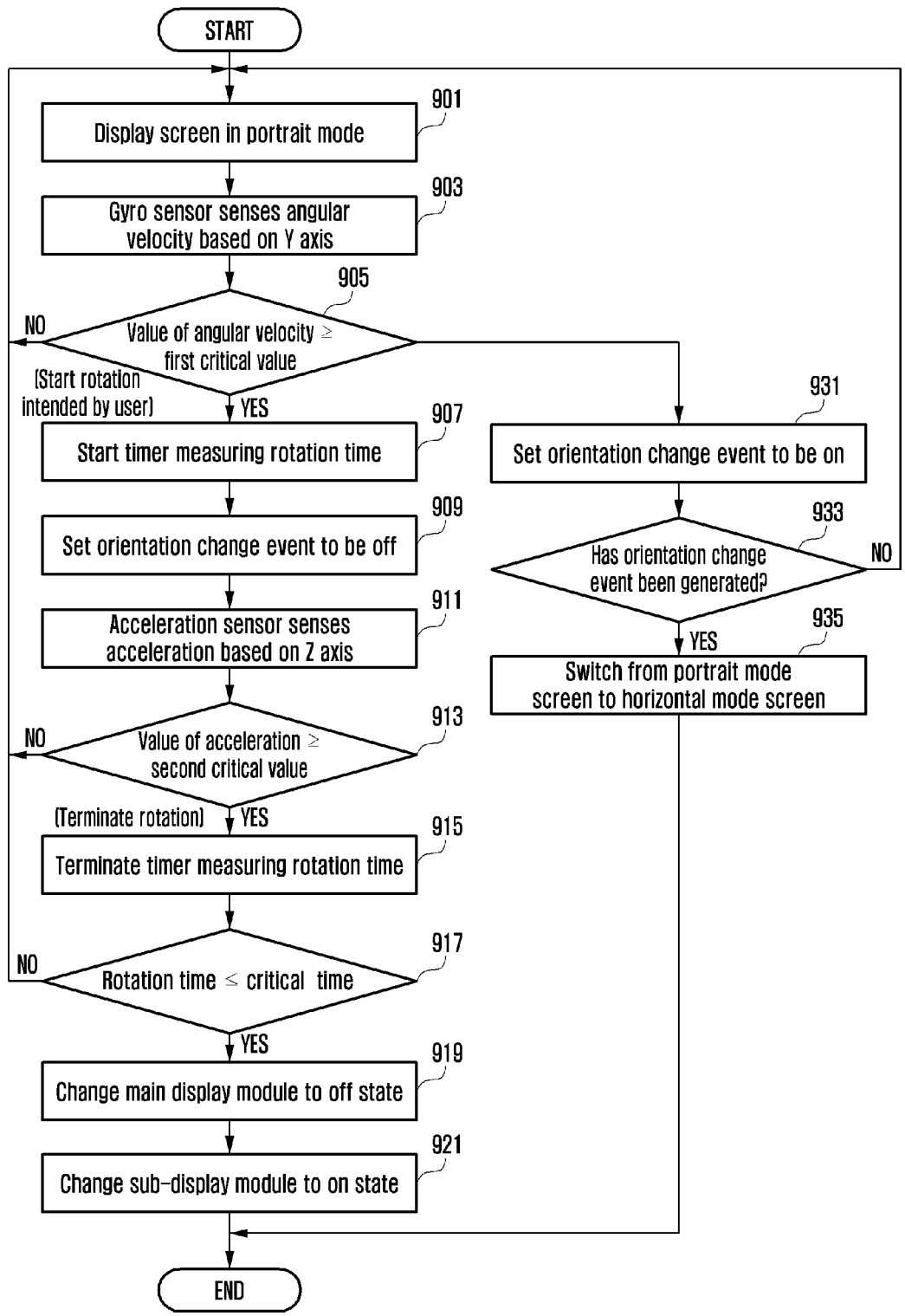

FIG. 9 is a flowchart illustrating an operation of the electronic device whose state switches according to yet another embodiment of the present disclosure.

In FIG. 9, the electronic device 300 may be displaying a screen in the portrait mode (901).

In this situation, the electronic device 300 may turn on the vertical axis.

While the electronic device 300 turns on the vertical axis, the gyro sensor of the electronic device 300 may sense angular velocity of the electronic device on the basis of the vertical axis (903).

The electronic device 300 may determine whether the value of the angular velocity based on the vertical axis is a first critical value or more (905).

If the value of the angular velocity based on the vertical axis is the first critical value or more, the electronic device 300 may determine that the rotation of the electronic device 300 intended by a user to turn over the electronic device 300 has started.

Accordingly, the electronic device 300 may start a timer which measures a rotation time (907).

Furthermore, the electronic device 300 may deactivate the screen change function for providing a change between the landscape mode screen and the portrait mode screen in response to a change in the direction of the electronic device 300.

For example, the electronic device 300 may set an orientation change event to be off so that the orientation change event is not generated in response to a change in the direction of the electronic device 300 (909).

Next, the electronic device 300 may change the main display panel from the on state to the off state and the sub-display panel from the off state to the on state based on the acceleration value of the electronic device sensed on the basis of the depth axis of the electronic device 300 and the rotation time measured by the timer. Corresponding operations 911 to 921 correspond to the operations 711 to 721 of FIG. 7.

Meanwhile, if the value of the angular velocity based on the vertical axis is less than the first critical value in the operation 905, the electronic device 300 may determine that the rotation of the electronic device 300 is not intended by the user to turn over the electronic device 300 and maintain each of the main display panel and main touch panel of the electronic device 300 in the on state.

Furthermore, the electronic device 300 may continue to activate the screen change function for providing a change between the landscape mode screen and portrait mode screen of the electronic device 300.

For example, the electronic device 300 may set an orientation change event to be on so that the orientation change event is generated in response to a change in the direction of the electronic device 300 (931).

In this case, the electronic device 300 may determine whether the orientation change event at which the direction of the electronic device 300 switches is generated (933).

When the orientation change event is generated, the electronic device 300 may change a screen of the electronic device 300 from the portrait mode screen to the landscape mode screen (935).

Figure 10:
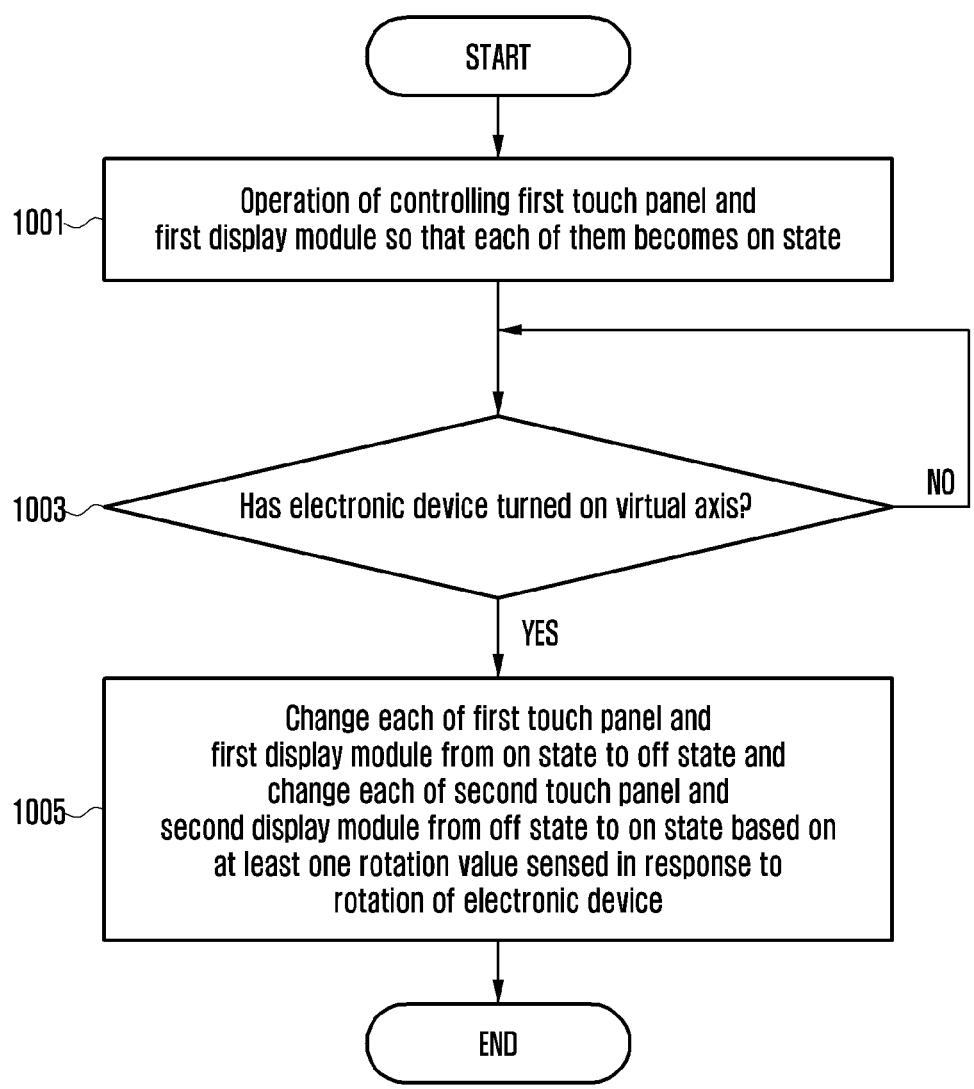

FIG. 10 is a flowchart illustrating an operation of the electronic device whose state switches according to another embodiment of the present disclosure.

In FIG. 10, the electronic device 300 may control the first touch panel and the first display panel so that each of them becomes the on state (1001).

Next, the electronic device 300 may determine whether the electronic device 300 turns on an axis using the rotation detection sensor (1003).

If, as a result of the determination, the rotation of the electronic device 300 is sensed, the electronic device 300 may change each of the first touch panel and the first display panel from the on state to the off state and change each of the second touch panel and the second display panel from the off state to the on state based on at least one rotation value sensed in response to the rotation of the electronic device 300 (1005).

In accordance with various embodiments, in the case where the rotation detection sensor includes the gyro sensor and the acceleration sensor, if a value of angular velocity sensed by the gyro sensor is a first critical value or more and an acceleration value sensed by the acceleration sensor is a second critical value or more, the electronic device 300 may change each of the first touch panel and the first display panel from the on state to the off state and change each of the second touch panel and the second display panel from the off state to the on state.

In accordance with various embodiments, if a rotation time of the electronic device 300 is a critical time or more, the electronic device 300 may change each of the first touch panel and the first display panel from the on state to the off state and change each of the second touch panel and the second display panel from the off state to the on state.

In accordance with various embodiments, when the electronic device 300 turns on the virtual axis, the electronic device 300 may deactivate the screen change function for providing a change between the landscape mode screen and the portrait mode screen based on at least one rotation value received from the rotation detection sensor.

In accordance with various embodiments of the present disclosure, when the electronic device turns on an axis, the first display panel and the second display panel automatically switch to the on state or the off state. Accordingly, the usability of a user who uses the electronic device can be significantly improved because the one of the first touch display and the second touch display that faces the user's line of sight is in an on state, while the other that is not likely to be visible to the user is in an off state.

Furthermore, when the electronic device turns on an axis, the first touch panel and the second touch panel automatically switch to the on state or the off state. Accordingly, an operation of the electronic device due to an unintended touch of the touch panel can be prevented.

Furthermore, when the electronic device turns on a virtual axis, the screen change function between a landscape mode screen and a portrait mode screen is temporarily deactivated. Accordingly, an unintended operation of the electronic device when turning can be prevented.

In addition, an effect which may be obtained or predicted through an embodiment of the present disclosure is directly or implicitly disclosed in the detailed description according to embodiments of the present disclosure. For example, various effects predicted according to embodiments of the present disclosure will be disclosed in the detailed description to be described.

The term "module" as used in the present disclosure may refer to a certain unit that includes one of hardware or hardware with instructions stored in memory. The term module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (application-specific integrated circuit) chip, FPGAs (field-programmable gate arrays), and programmable-logic device, which have been known or are to be developed.

It will be understood that the above-described embodiments are examples to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising a plurality of touch displays, comprising:
   a first touch display comprising a first touch panel and a first display panel;
   a second touch display comprising a second touch panel and a second display panel;
   a rotation detection sensor configured to sense a rotation of the electronic device;
   a processor electrically connected to the first touch display, the second touch display and the rotation detection sensor; and
   memory electrically connected to the processor,
   wherein the memory stores instructions that, when executed, cause the processor to:
      identify a rotation value of a rotation of the electronic device in response that the rotation detection sensor detects that the electronic device turns on an axis,
      control the first touch panel from an on state to an off state when the identified rotation value is equal to or greater than a first critical value,
      identify a rotation time based on lapse of time between a time point when the first touch panel changes from the on state to the off state and a time point when the rotation detection sensor detects an acceleration of gravity of the electronic device equal to or greater than a second critical value, and
      control the first display panel to change from the on state to the off state and control the second touch panel and the second display panel to change from an off state to an on state, when the identified rotation time is equal to or less than a critical time.

2. The electronic device of claim 1, wherein the rotation detection sensor comprises a gyro sensor configured to sense rotation speed of the electronic device and an acceleration sensor configured to sense the acceleration of gravity of the electronic device when the electronic device turns on the axis.

3. The electronic device of claim 2, wherein the rotation value comprises at least one of a value of angular velocity and a value of an angle of rotation according to the rotation of the electronic device.

4. The electronic device of claim 2, wherein the rotation value comprises a value of the acceleration of gravity according to the rotation of the electronic device.

5. The electronic device of claim 2, wherein the memory stores instructions that, when executed, cause the processor to control each of the first touch panel and the first display panel to change from the on state to the off state and control each of the second touch panel and the second display panel to change from the off state to the on state if a value of angular velocity sensed by the gyro sensor is equal to or greater than the first critical value and an acceleration value sensed by the acceleration sensor is equal to or greater than the second critical value.

6. The electronic device of claim 1, wherein the memory stores instructions that, when executed, cause the processor to deactivate a screen change function for providing a change between a horizontal mode screen and a portrait mode screen based on the at least one rotation value received from the rotation detection sensor when the electronic device turns on the axis.

7. The electronic device of claim 1, wherein the turning of the electronic device on the axis comprises turning the electronic device on the axis so that the first touch display turns to face a second direction and the second touch display turns to face a first direction.

8. The electronic device of claim 1, wherein the axis comprises an axis extending in a vertical direction or horizontal direction of the electronic device.

9. The electronic device of claim 1, wherein the first touch display is facing a user of the electronic device.

10. A method for changing, by an electronic device, a state, the electronic device comprising a first touch display comprising a first touch panel and a first display panel and a second touch display comprising a second touch panel and a second display panel, the method comprising:
    controlling the first touch panel and the first display panel so that each of the first touch panel and the first display panel becomes an on state;
    identifying a rotation value of a rotation of the electronic device in response that a rotation detection sensor detects that the electronic device turns on an axis;
    controlling the first touch panel to change from the on state to an off state when the identified rotation value is equal to or greater than a first critical value;
    identifying a rotation time based on lapse of time between a time point when the first touch panel changes from the on state to the off state and a time point when the rotation detection sensor detects an acceleration of gravity of the electronic device equal to or greater than a second critical value; and
    controlling the first display panel to change from the on state to the off state and controlling the second touch panel and the second display panel to change from an off state to an on state, when the identified rotation time is equal to or less than a critical time.

11. The method of claim 10, wherein the rotation detection sensor comprises a gyro sensor configured to sense rotation speed of the electronic device and an acceleration sensor configured to sense the acceleration of gravity of the electronic device when the electronic device turns on the axis.

12. The method of claim 11, wherein the rotation value comprises at least one of a value of angular velocity and a value of an angle of rotation according to the rotation of the electronic device.

13. The method of claim 11, wherein the rotation value comprises a value of the acceleration of gravity according to the rotation of the electronic device.

14. The method of claim 11, further comprising:
controlling each of the first touch panel and the first display panel to change from the on state to the off state and controlling each of the second touch panel and the second display panel to change from the off state to the on state if a value of angular velocity sensed by the gyro sensor is equal to or greater than the first critical value and an acceleration value sensed by the acceleration sensor is equal to or greater than the second critical value.

15. The method of claim 10, further comprising an operation of deactivating a screen change function for providing a change between a horizontal mode screen and a portrait mode screen based on the at least one rotation value received from the rotation detection sensor when the electronic device turns on the axis.

16. The method of claim 10, wherein the turning of the electronic device on the axis comprises turning the electronic device on the axis so that the first touch display turns to face a second direction and the second touch display turns to face a first direction.

17. The method of claim 10, wherein the axis comprises an axis extending in a vertical direction or horizontal direction of the electronic device.

18. The method of claim 10, wherein the first touch display is facing a user of the electronic device.

* * * * *